United States Patent [19]

Benisti

[11] 4,388,839

[45] Jun. 21, 1983

[54] DEVICE FOR THE ELABORATION, THE COMPOSITION, THE MIXING AND THE USE OF LIQUIDS, PRODUCTS OR INGREDIENTS

[76] Inventor: Julien Benisti, 49, rue Youri Gagarine, Colombes, France, 92700

[21] Appl. No.: 287,713

[22] PCT Filed: Nov. 26, 1980

[86] PCT No.: PCT/FR80/00167

§ 371 Date: Jul. 28, 1981

§ 102(e) Date: Jul. 28, 1981

[87] PCT Pub. No.: WO81/01504

PCT Pub. Date: Jun. 11, 1981

[30] Foreign Application Priority Data

Nov. 28, 1979 [FR] France ................. 79 29281

[51] Int. Cl.³ ............................. G01F 19/00
[52] U.S. Cl. ........................................ 73/428
[58] Field of Search .............. 73/427, 428; 215/365

[56] References Cited

U.S. PATENT DOCUMENTS

| | | | |
|---|---|---|---|
| 641,052 | 1/1900 | Strauss | 73/427 |
| 1,744,328 | 1/1930 | Morley | 73/427 |
| 2,010,534 | 8/1935 | Collins | 73/428 |
| 2,801,541 | 8/1957 | Moreland | 73/428 |

*Primary Examiner*—S. Clement Swisher
*Attorney, Agent, or Firm*—Larson & Taylor

[57] ABSTRACT

The invention concerns an instrument of the portable type, which allows for the elaboration of an unlimited number of recipes and for the monitoring of the use or the consumption of different volumes or compositions, easily and without particular knowledge.

The device comprises a transparent receptacle (5) equipped with means of fixation (6) of cards (7) made in plastic, "Rhodoid", cardboard or other materials.

The receptacle (5), cylindrical or otherwise in shape, has an internal surface formed of flat vertical facets (11) presenting the general aspect of a magnifying flass, improving the visibility and the definition of the levels. The angles formed by the flat surfaces of the facets facilitate the homogeneity of the mixture.

Amont the most interesting applications of the invention, one may cite:
elaboration of recipes: pastries, drinks, liquids;
pharmaceutical formulae;
the control of the feeding of the ill, etc.

7 Claims, 9 Drawing Figures

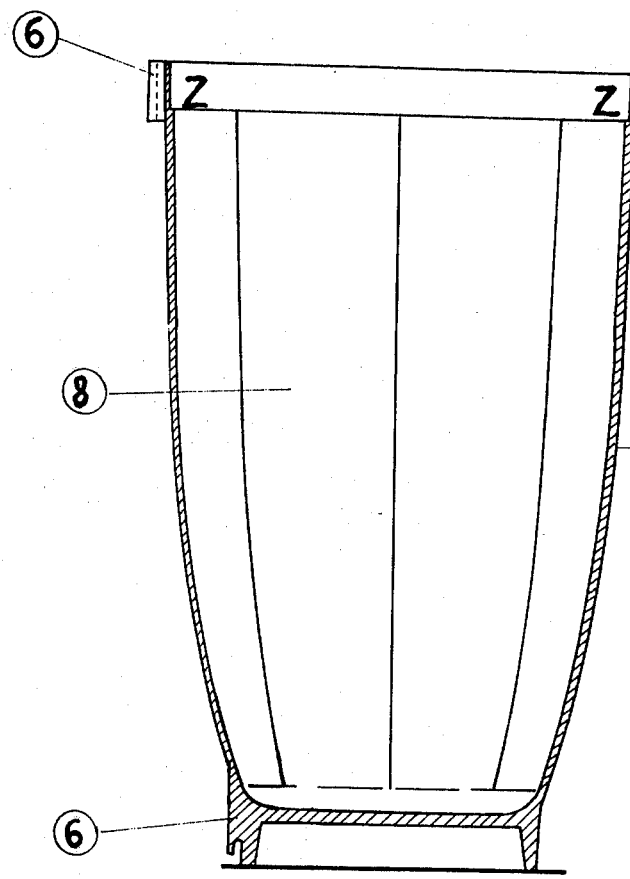
COUPE AA
FIG:2
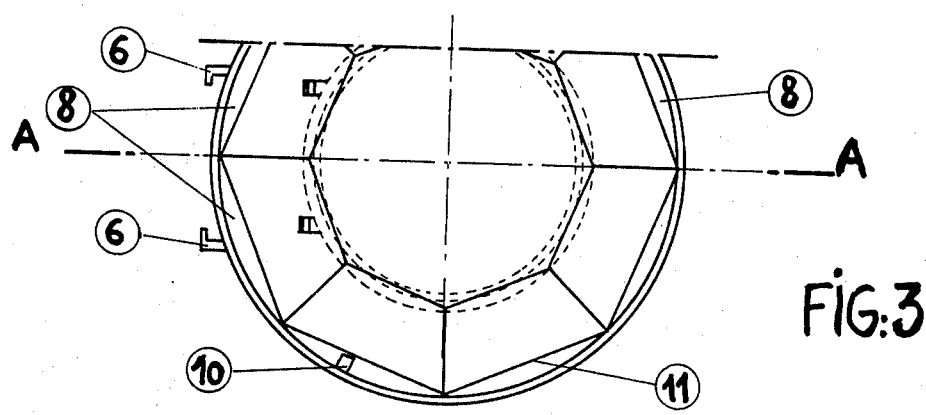
FIG:3

DEVICE FOR THE ELABORATION, THE COMPOSITION, THE MIXING AND THE USE OF LIQUIDS, PRODUCTS OR INGREDIENTS

The present invention concerns those instruments of the portable type which allow for the elaboration of an unlimited number of recipes and different volumes, by means of movable cards upon which are printed the level and the name of the products constituting the recipe: another use would be the replacing of the recipe card by the time card thus allowing one to check the rate of flow or absorption of the mixture obtained as previously stated, or pre-prepared.

In receptacles of this type already known, the indicated or advised doses have to be measured out by the user: this is imprecise and modifies the balance of the proportions and literally transforms the envisaged preparation.

Another disadvantage is that, when the different products are being administered, mistakes can be made because a metal receptacle does not allow one to follow the preparation thanks to transparency.

The same happens when a transparent receptacle has a few recipes printed around it—they are always the same and reading them is hard. Neither can one change the recipes because they are printed on the receptacle itself, thus limiting the number of preparations and the text gets confused.

The device in accordance with the invention allows for an ease of preparation unheard of in previously known means. Much time is thereby gained because it is unnecessary to refer to a recipe book and to measure each ingredient in a separate appliance, and then pour it into a receptacle, beginning again these operations as many times as there are products.

This invention most certainly aims at a technical result by the fact that such a lay-out of information on the cards, as well as the improved visibility and definition of levels and the ingredients, at the same time as it favorises the homogeneity of the mixtures, avoids those different inconveniences.

The receptacle, made in a transparent material, is equipped with either a receipe or time card, printed on one or both sides. This card is fixed on to it by an appropriate system of fixation. Thus a same card may have different proportions or quantities on the front and on the back. One can thus obtain an infinite number of cards which can be fitted to the receptacle, itself equipped with a system of fixation of the above-mentioned cards.

The means by which the cards are fixed on consist of:

at the top, two vertically orientated sliding channels corresponding to the width of the card which is thus held in place laterally.

The distance of the sliding channels from the external surface corresponds to the thickness of the card, which is held flat against the side of the receptacle;

at the bottom, components forming stops, equipped with a groove parallel to the cylindrical surface of the base and set at a distance allowing for the passage of the width of the bottom of the card and the attaching of the card by its internal angles of the wider parts placed on the left and on the right of the card.

The means of fixation are conceived of in such a way as to keep the vertical edges of the cards pressed flat against the outside, against the enlarging wall, and straddling two contiguous facets. The cards may be made in flexible material which is also rigid, notably plastics, cardboard or "Rhodoid". According to needs they may be opaque, transparent, transluscent or diaphanous.

The cards may also be printed in foreign languages, thus for the same recipe, one card for each required foreign language.

Schematically, the cards resemble a side view of a railroad-track rail because they are equipped at each of their lower and upper angles with parts which jut out; the lower horizontal edge at the top and the upper horizontal edge at the bottom rest upon, and are held in place by, supports placed both at the top and the bottom.

A card may be put in position first by fixing its lower end into the slot and then the top of it is fitted into the sliding channels by pressing on the wider part to draw in the top vertical edges of the card; the wider top part is therefore above the level of the sliding channels. To take the card out and replace it, the operation is performed in reverse, i.e. by disengaging the upper part of the card by exerting pressure on the wide part and then disengaging the lower part.

This type of card adapted to a transparent receptacle has the advantage of allowing for the preparation of an infinite number of recipes, e.g. drinks, pastries, mixtures, nutritional liquids for feeding the ill by means of a feeding tube operated by a pump. In the latter case, once the mixture has been obtained, the recipe-card is replaced by a time-card corresponding to the volume of the mixture.

The monitoring exercised over the alimentation of the patient is gradual because the level—visible due to the transparent nature of the receptacle—must correspond to the hourly quantity prescribed by the doctor. This check is possible at any moment and is easily and precisely obtained by merely reading off the level against the time-card.

This system presents the advantage of card changing depending on the size of the volume prescribed.

Another characteristic of the invention resides in the construction of the internal surface of the receptacle: this is constituted of vertical facets which improve level visibility as they possess magnifying properties, the external surface of the receptacle being cylindrical or frustoconical.

The magnifying of the levels makes for a greater precision in the proportions to be respected when the recipe is being prepared by means of the card held vertically against the external surface.

Over and above the advantages as set out above, the interior facets improve the homogeneity of the mixture because of the positioning of the facets which form angles which in turn project the liquids, products or ingredients from one side to the other during lateral movements, resulting in a stronger, therefore more efficient, mixing action.

When the receptacle is used as a shaker a removable "fruit-pressing" plate (prevented from turning during the rotative movements of the fruit to be pressed by a lug) is inserted between the body of the shaker and a watertight cover. This cover has a bottle-neck at its uppermost extremety and a strainer at its base. During the mixing of the preparation, the whole assembly is closed by a watertight stopper.

These objects are reached, according to the invention, due to the fact that the recipe or time cards are used alternatively for the preparation of all kinds of cocktails, in pastry-cooking, or for all diverse forms of preparation and the user can bring up to date or renew the collection of recipe or time cards by new ones which come out later, or by using them in other fields.

The invention will be better understood from the following description, made with reference to the accompanying drawings, which show, by way of example only, one embodiment of the invention.

In these drawings:

FIG. 2 is a cross-section along A—A in FIG. 1;

FIG. 3 is a top view, at the level of AA, of FIG. 1;

Figure 1:
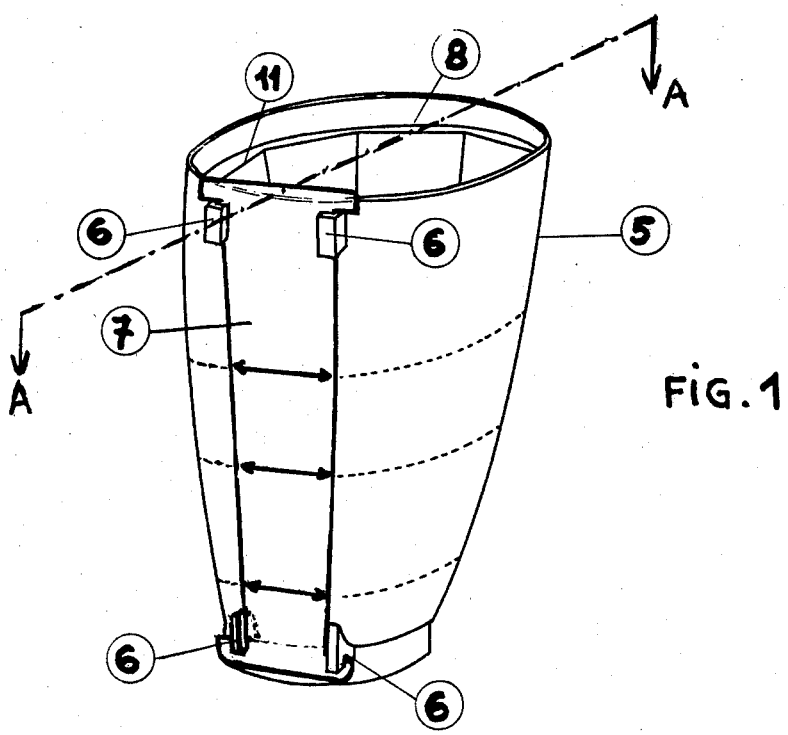
FIG. 1 is a schematic view showing the portable receptacle equipped with its upper and lower fixation systems for holding the time or recipe cards in place.
Figure 4:
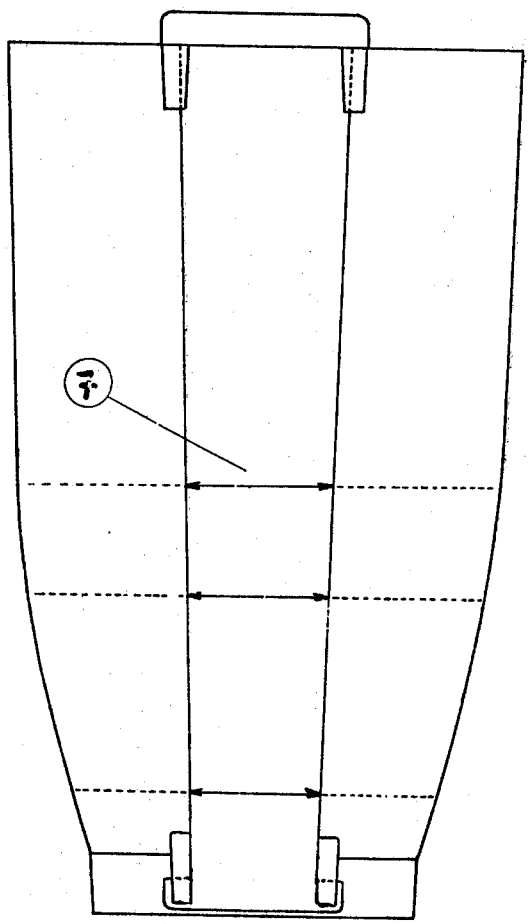
FIG. 4 is a view of the time or recipe card; the printed indications can be replaced, at the top, by the indication of the volume in CC and, going down, by the indication of the time-levels from 0-24 hours.
Figure 6:
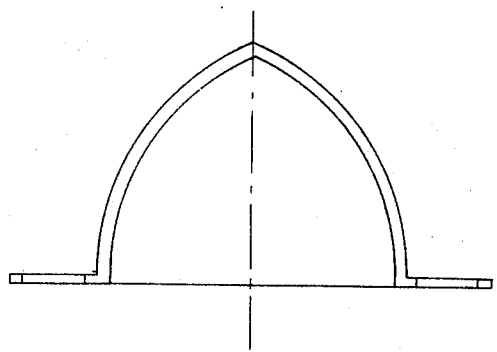
FIG. 6 is a schematic view in profile of the fruit-presser.
Figure 5:
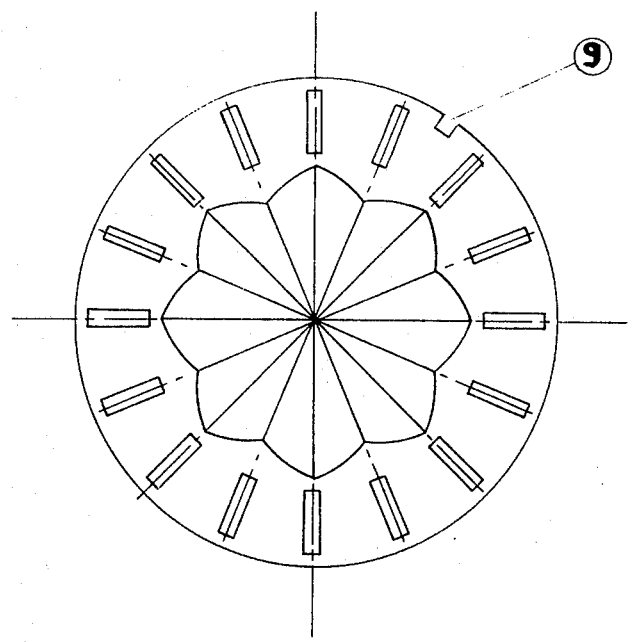
FIG. 5 is a top-view of the fruit-presser designed to fit into the receptacle at line 22 of FIG. 2.
Figure 9:
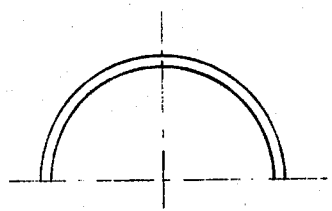
FIG. 9 is a cross-sectional top view of the stopper 1 of FIG. 7.
Figure 7:
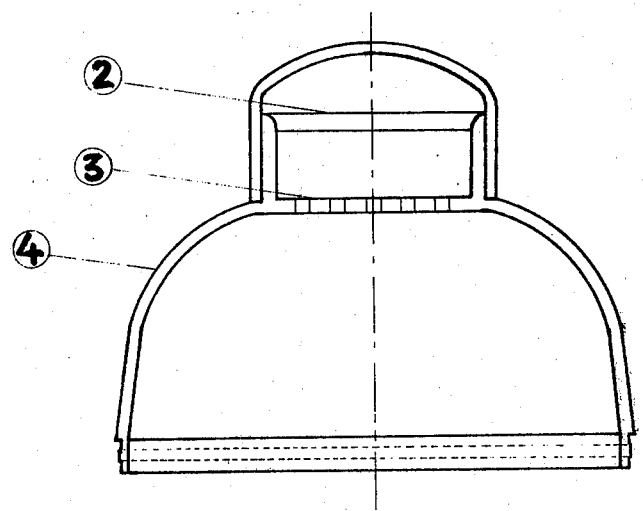
FIG. 7 is a cross-sectional view of the cover intended to transform the portable receptacle into a shaker.
Figure 8:
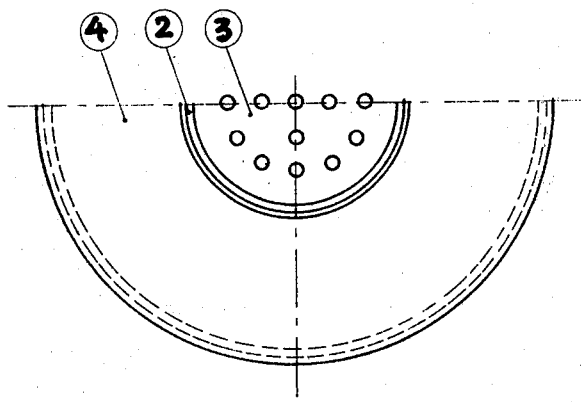
FIG. 8 is a cross-sectional top view of the cover of FIG. 7.

In accordance with the invention, the device comprises a transparent body 5, the essential characteristic being its curved frustoconical shape, although this definition of shape should not be taken as restrictive. Its external smooth surface has a system which projects outwards at the top and the bottom for the purpose of holding the time or recipe cards in place, which will be retained in abutment either by the top or the bottom part of the system, thus avoiding any disparity with the zero level of the receptacle. In this manner, the cards are held flat against the outcurving surface, straddling two external facets.

At the top of the body 5 fits a fruit-presser which is held fixed, despite the rotational movements exercised when pressing the fruit, by a notch 9 and a stop 10 formed in the thickness of a facet (FIG. 3).

The user of this receptacle 5 who wishes to prepare a recipe will choose the card 7 which he requires and will fit it into the system 6, at the top and bottom of the body 5. This operation over, he merely has to follow the levels printed on the card 7 and pour in the liquid or product designated on card 7. The composition will be obtained simply and precisely.

In fact, the interior facets constitute a magnifying glass and the levels will be better defined and easily visible since the card 7 will be on the far left and right with regard to the median of the two external facets 8.

The composition ready, card 7 can be withdrawn and the body 5 completed by a cover 4. This in turn is sealingly closed by a stopper 1 covering a bottle-neck 2 and allows for the pouring of the preparation (after shaking) by withdrawing the stopper 1. The strainer 3 retains any products not to be consumed.

This device allows for a rational and agreable utilisation and its appearance, when one serves, gives no indication as to the method used to obtain the result, recipe-cards being removable.

The device, subject of the invention, can be used in every case when the preparation of a recipe or of a formula, or even when the rate of flow in a receptacle must be ensured precisely and easily without specialised knowledge, necessarily and most especially when the proportions must be respected, either at the moment of preparation or of utilisation. It can be used just as well by a house wife as by a barman, in restauration and even in the medical and pharmaceutical fields.

Uses of particular interest may be the elaboration of recipes for drinks or pastries and the preparation of fluids for medical or pharmaceutical purposes. The double function of the appliance permits the elaboration of preparations and the control, by transparency, of the consumption of a quantity based on time-schedules, themselves being variable according to needs.

Of course, the invention is not limited to the above-described embodiments given only as examples. The invention comprises all the technical equivalents of the means described above as well as their combinations if these are executed as described above and within the scope of the following claims.

Thus e.g. the instrument, equipped with different cards bearing recipes, compositions or time-schedules, can be completed with accessories which would enlarge the field of application of the invention; notably by means of a mechanism or axle in the shape of a crank-shaft to the end of which would be fixed a propellor moved manually or electrically.

I claim:

1. A portable device for receiving a liquid volume, comprising a vessel having a lateral wall, means arranged for removably retaining an interchangeable indication-bearing card against the outer surface of said vessel which is of transparent material at least in the portion thereof receiving said card, wherein said vessel wall has a circular external cross-section and a polygonal internal cross-section for constituting magnifying lenses improving accuracy in the reading of the liquid level.

2. Device according to claim 1, wherein the transparent vessel wall has an outer surface which is substantially cylindrical or frustoconical in shape.

3. Device according to claim 1, wherein said means for removably retaining cards are located for the card to straddle an edge of the inner surface of said vessel defined by a corner of said polygonal internal cross-section.

4. Device according to claim 1, wherein the cards are in strip form and the means for retaining said cards comprises two channels formed in said vessel and vertically directed when in use, placed at a distance corresponding to the strip width and further comprises stop means for removable attachment of said strip.

5. Device according to claim 1, wherein said vessel has a polygonal internal cross-section substantially throughout its length whereby its inner surface consists of flat facets.

6. Device according to claim 1 for use as a shaker for the elaboration of recipes, wherein each said card bears the indication of levels for ingredients and the names of the ingredients.

7. Device according to claim 1, for use in dispensing liquids, wherein said card bears indications of levels and of times corresponding to said levels.

* * * * *